Jan. 9, 1962    A. M. NELSON ETAL    3,016,239
CARD PROCESSING SYSTEM

Filed June 17, 1958    5 Sheets-Sheet 1

Fig.1

INVENTORS
Alfred M. Nelson
Hans M. Stern
Jerome B. Wiener

By Smyth & Roston
Attorneys.

Jan. 9, 1962   A. M. NELSON ETAL   3,016,239
CARD PROCESSING SYSTEM

Filed June 17, 1958   5 Sheets-Sheet 4

INVENTORS:
Alfred M. Nelson
Hans M. Stern
Jerome B. Wiener

Attorneys

Jan. 9, 1962  A. M. NELSON ET AL  3,016,239
CARD PROCESSING SYSTEM
Filed June 17, 1958

INVENTORS:
Alfred M. Nelson
Hans M. Stern
Jerome B. Wiener

Attorneys

United States Patent Office 3,016,239
Patented Jan. 9, 1962

3,016,239
CARD PROCESSING SYSTEM
Alfred M. Nelson, Redondo Beach, Hans M. Stern, Culver City, and Jerome B. Wiener, Granada Hills, Calif., assignors to Magnavox Company, Los Angeles, Calif., a corporation of Delaware
Filed June 17, 1958, Ser. No. 742,546
4 Claims. (Cl. 271—5)

The present invention relates to apparatus for handling information storage cards on which data is recorded and to pneumatic apparatus for obtaining a transfer of cards to an output station. More particularly, the invention is directed to a reversible card holding station for use in such apparatus. A card holder is included in the reversible station of the invention, and information storage cards are held in the card holder in a stacked relationship. The apparatus of the invention is of the type having a first operational mode in which cards may be controllably fed in sequence out of the station, and having a second operational mode in which cards may be controllably stacked into the station.

The reversible card holding station of the invention is intended to be used in conjunction with a suitable transport means for the cards. This transport means serves to carry the cards from the card holding station to a processing station, and it serves subsequently to return the cards to the same or to another card holding station. This transport means may, for example, be a rotatable drum which exerts a vacuum pressure at its peripheral surface for carrying the cards on that surface. Such a drum will be described subsequently in this specification.

A feature of the improved reversible card holding station of the invention is that it is constructed to enable certain cards to be carried by the transport means past the holding station and to permit other cards to be stripped from the transport means and deposited in the station. This feature renders the improved card holding station of the invention most appropriate for use in a wide variety of data processing systems. Certain sorting, merging or collating systems, for example, require that the cards be fed to a common transport means for processing, and then that the cards be selectively deposited in different ones of a plurality of card holding stations associated with the transport means. It is evident that, for simplicity in such systems, at least some of the card holding stations should be constructed to enable cards to be transported past them by the transport means so that such cards may be selectively deposited in other selected ones of the card holding stations. This is necessary unless additional transport means, or other extraneous equipment is used.

The improved card holding station of the invention finds utility in systems such as the systems referred to above, and in such systems the station exhibits the ability to controllably receive cards from the transport means, to controllably feed cards to the transport means and to allow cards on the transport means to "pass under" its mouth when such cards are to be deposited in another holding station.

In the field of data processing, digital techniques have been used to store a wide variety of information and to assimilate such information for subsequent use. In one type of data processing system, the information is stored on a plurality of cards such as those referred to in the preceding paragraphs. These cards may conveniently form the storage medium with which the reversible station of the invention is adapted to be associated.

Each card used, for example, is provided with a plurality of positions for storing discrete bits of information on one or both of its sides. This information may be stored in the form of magnetic areas of one polarity or another, or it may be stored in the form of holes punched in the card in accordance with a predetermined code, or in any other appropriate form.

Thousands of information storage cards of the type under discussion are used in complex data processing systems, so that the millions of pieces of information required to represent the data utilized in such systems may be adequately stored. The information storage cards are maintained in a stacked relationship in the processing systems in appropriate card holders in card holding stations of the type with which the present invention is concerned. These cards are sequentially transferred to a first vacuum transport drum from the holding stations, and the cards may then be transferred from that drum to other drums to enable the cards to be processed. Such processing consists in reading information or data already on the cards, or in writing new data or information onto the cards.

The vacuum transport drum referred to above forms one convenient means for transporting the cards from the card holding stations to the processing station. Such drums, as noted, will be described in detail subsequently in the present specification. However, it will be evident as the description proceeds that other known means may be used for transporting the cards.

Upon the completion of the processing operation, the cards are returned either to the same reversible card holding station, or to different card holding stations, for subsequent use. This return is usually made in the original order of the cards, but it may be made in a different type of order depending upon the operation being performed by the data processing system.

Copending application Serial No. 538,111 filed October 3, 1955, in the name of Robert M. Hayes et al., and now United States Patent No. 2,842,362, issued on July 8, 1958, discloses a reversible card holding station. This station is capable of operating in a first operational mode to control the transfer of cards from a card holder to a transport means, and it is capable of operating in a second operational mode to strip cards from the drum and to deposit such cards in the card holding station. The apparatus of the copending application permits cards to be fed from a particular card holding station to the transport means for subsequent processing and then to be returned automatically to the same card holding station after the processing has been completed. The apparatus of the copending application also permits a convenient interchange of cards between two or more reversible card holding stations for sorting or collating purposes. In these and in many other systems, reductions in complexity are realized by using the reversible apparatus of the copending application.

The reversible feeding-stacking station and apparatus of the copending application utilizes mechanical linkages and members to accomplish its desired reversible function. Copending application Serial No. 645,639 filed March 12, 1957, in the name of Alfred M. Nelson, et al., now U.S. Patent No. 2,969,979, also discloses a reversible feeding-stacking station which is intended to accomplish the purposes of the station of the first copending application. However, the reversible feeding-stacking station of the latter copending application utilizes pneumatic or vacuum pressure principles, rather than strictly mechanical linkages, to retain the cards in the station and for controllably feeding the cards from the station to the transport means.

The apparatus of the latter copending application includes a vacuum pressure feed head. This feed head is pivotally mounted in the disclosed embodiment of the invention for cam operation. When the reversible station of the latter copending application is conditioned to feed cards controllably to the transport means, the feed head is pivoted to an operating position. When the feed head is in its operating position, the construction is such that a vacuum pressure may be controllably provided at one of its surfaces. This vacuum pressure is exerted on the leading card in the station, and this card is also under the influence of a force from the transport means. The vacuum pressure exerted on the card by the feed head, however, is sufficient to overcome the force exerted by the transport means and the card is retained in the card holding station.

A solenoid-controlled valve is disposed in the line which provides vacuum pressure to the feed head in the station of the latter copending application. This valve is controllable to interrupt the vacuum pressure at the surface of the feed head in order to release the leading card to the transport drum. By periodically energizing the solenoid valve to interrupt the vacuum pressure at the feed head, the cards in the station can be released sequentially to the transport means. Alternately, by a continual energizing of the solenoid valve, the cards can be "free run" one after the other out of the station.

When the reversible card holding station of copending application Ser. No. 645,639 is to be used as a stacking station, the feed head is pivoted by a suitable cam mechanism to a stand-by position, and a stack head is pivoted at the same time from a stand-by position to an operative position. In the copending application, and when the stack head is in its operative position, it is moved into close engagement with the transport means so that it can strip cards from the periphery of the transport means to be deposited in the card holder. It is clear that when the stack head is in such a position in the apparatus of the copending application, no cards can be transported by the transport means past the stack head.

In accordance with the concept of the present invention, the reversible card holding station to be described may be similar to that of either of the copending applications referred to above. However, when the stack head of the station of the present invention is moved to its operative position, it is positioned to be spaced from the transport means. Such a spacing is sufficient to enable the transport means freely to carry cards past the mouth of the reversible station. However, an additional member, such as a blower, is also associated with the reversible card holding station in accordance with the invention. This blower may be controllably activated to direct a stream of pressurized fluid between the stack head and the transport means whenever it is desired to transfer a card from a transport means to the station. The cards so transferred into the station are held in the card holder of the station by the stack head. Now, when it is desired to feed cards from the station to the transport means, the positions of the feed head and the stack head are reversed so that the feed head is moved into position to control the transfer of cards out of the station.

As noted above, the station of the invention may conveniently be used in a wide variety of data processing systems. This follows because, not only is the station reversible to permit cards to be fed into it or out of it, but the station is also constructed so that cards may be carried past it by the transport means even though it is in its stacking operational mode and even though cards already have been placed in the station.

Figure 1:
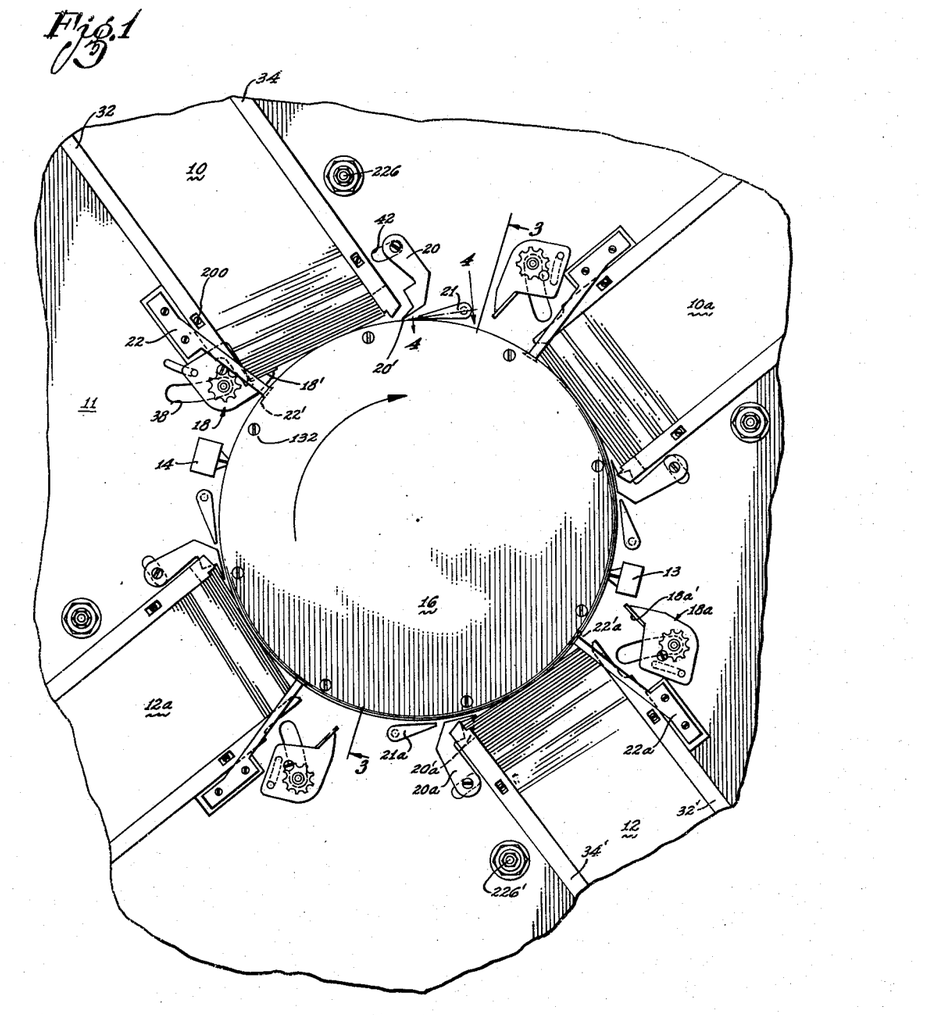
FIGURE 1 is a top plan view of a simplified data processing system utilizing the apparatus of the invention, this view illustrating in somewhat schematic form a pair of reversible feeding-stacking card holding stations disposed contiguous to a rotatable vacuum pressure transporting drum, which stations are adapted to feed information storage cards to the drum for processing purposes or to strip cards from the drum so that such cards may be deposited into the stations, this view also illustrating the constructional details of the reversible card holding station of the invention which enable cards to be transported past it by the transporting drum even though the station is mechanically in a stacking operational mode.

In the system of FIGURE 1, a rotatable vacuum pressure transport drum 16 is mounted on a table top 11. The drum 16 is constructed (as will be described) to exert a vacuum pressure at its peripheral surface. This vacuum pressure serves to retain the information cards firmly on that surface in fixed angular positions so that the cards may be transported by the drum from one station to another. The construction and operation of the transport drum will be described in detail subsequently.

A first reversible card holding station, designated generally as 10, is mounted on the table top 11 with its mouth in contiguous relationship with the peripheral edge of the drum 16. A second reversible card holding station, which is designated generally as 12, is also mounted on the table top 11 and is positioned diametrically opposite to the card holding station 10. The card holding station 12 also has its mouth disposed in contiguous relationship to the drum 16. The drum 16 is illustrated as rotating in a clockwise direction.

A first transducer means 13 is mounted on the table top 11, and this transducer means is positioned between the card holders 10 and 12. A second transducer means 14 may also be mounted on the table top on the opposite side of the vacuum transporting drum 16 from the transducer means 13. The transducer means 13 and 14 may be suitable and well known type of electro-magnetic transducer head, or series of heads. For example, these transducer means may be constructed in a manner similar to the heads described in copending application Serial No. 550,296 filed December 1, 1956 in the name of Alfred M. Nelson et al.

The reversible card holding station 10 is illustrated as being in its feeding operational mode. The station has a vacuum pressure feed head 18, pivotally mounted adjacent its leading wall. This station also has a stack head 20 which is pivotally mounted adjacent its trailing wall. The construction and operation of the feed head 18 and of the stack head 20 are similar to the embodiment disclosed in the copending application Ser. No. 645,639 referred to above, and their construction will also be described in some detail subsequently.

The feed head 18 is controlled to exert a vacuum pressure at its surface $18^1$ when the station is in its illustrated feeding mode and the feed head is moved to its operative position. This vacuum pressure is controllable and it is exerted on the trailing portion of the leading card in the card holding station 10. The same leading card rests on the periphery of the drum 16, and the drum also exerts a force on the card. The stack head 20 is withdrawn to its stand-by position, as illustrated in the station 10, and the feed head 18 is in its operative position when the station is conditioned to its feeding mode. When the stack head 20 is in its stand-by position, it is withdrawn from the periphery of the drum 16 so that cards are free to move from the station 10 onto the drum.

The force exerted by the vacuum pressure at the periphery of the transport drum 16 tends to withdraw the leading card from the station 10, whereas the force exerted by the feed head 18 tends to retain the card in the holder. The force of the feed head 18 is made greater so that it is able to overcome the force exerted on the card by the drum 16. So long as the leading card is held in this manner in the station 10, the other cards are supported in stacked relationship in the station.

Whenever the vacuum pressure to the feed head 18 is momentarily interrupted, the leading card in the station 10 is withdrawn by the drum 16. The interval of the interruption in the vacuum pressure to the feed head 18 is usually made sufficiently long so that only one card can be released from the card holder to the periphery of the transport drum. The next card in the station now comes into position and it is retained in the station until the next interruption of the vacuum pressure to the feed head 18. The trailing wall of the station forms a throat with the periphery of the drum 16, and this throat has a width corresponding to the thickness of a single card. Therefore, whenever the vacuum pressure of the feed head 18 is interrupted, only one card at a time is able to pass out of the station and onto the periphery of the drum 16.

In the stacking operational mode of the reversible card holding station 10, the feed head 18 is withdrawn to a stand-by position and its vacuum pressure is turned off in a manner fully described in the copending application Ser. No. 645,639 referred to above. The stack head 20 is simultaneously moved into its operative position in which its leading edge projects into the station to hold cards in the station in a stacked condition. When the stack head 20 is so moved to its operative position, the arrangement is such that the lower face of the stack head is spaced from the periphery of the drum 16. This enables cards transported on that periphery to pass under the station 10, even though the stack head 20 is moved to its operational state.

A blower member 21, which will be described in detail, is mounted on the table top 11 adjacent the stack head 20. The blower member 21 is also positioned to be spaced from the periphery of the drum 16, so that an information card transported on that periphery may be carried past the stack head 20 and past the blower member 21. However, the blower member is positioned to introduce a stream of fluid, such as pressurized air, tangentially of the drum 16 and between the stack head 20 and the periphery of the drum 16. This stream of pressurized fluid may be electrically controlled by means of a usual solenoid valve in a pressure line extending to the blower. Whenever the solenoid valve is controlled so that the blower emits the stream of pressurized fluid, a card transported on the periphery of the drum 16 coming under the influence of the pressurized fluid has its leading edge stripped from the periphery of the drum by the fluid to extend over the stack head and to be arrested by the stack head.

Figures 2, 4:
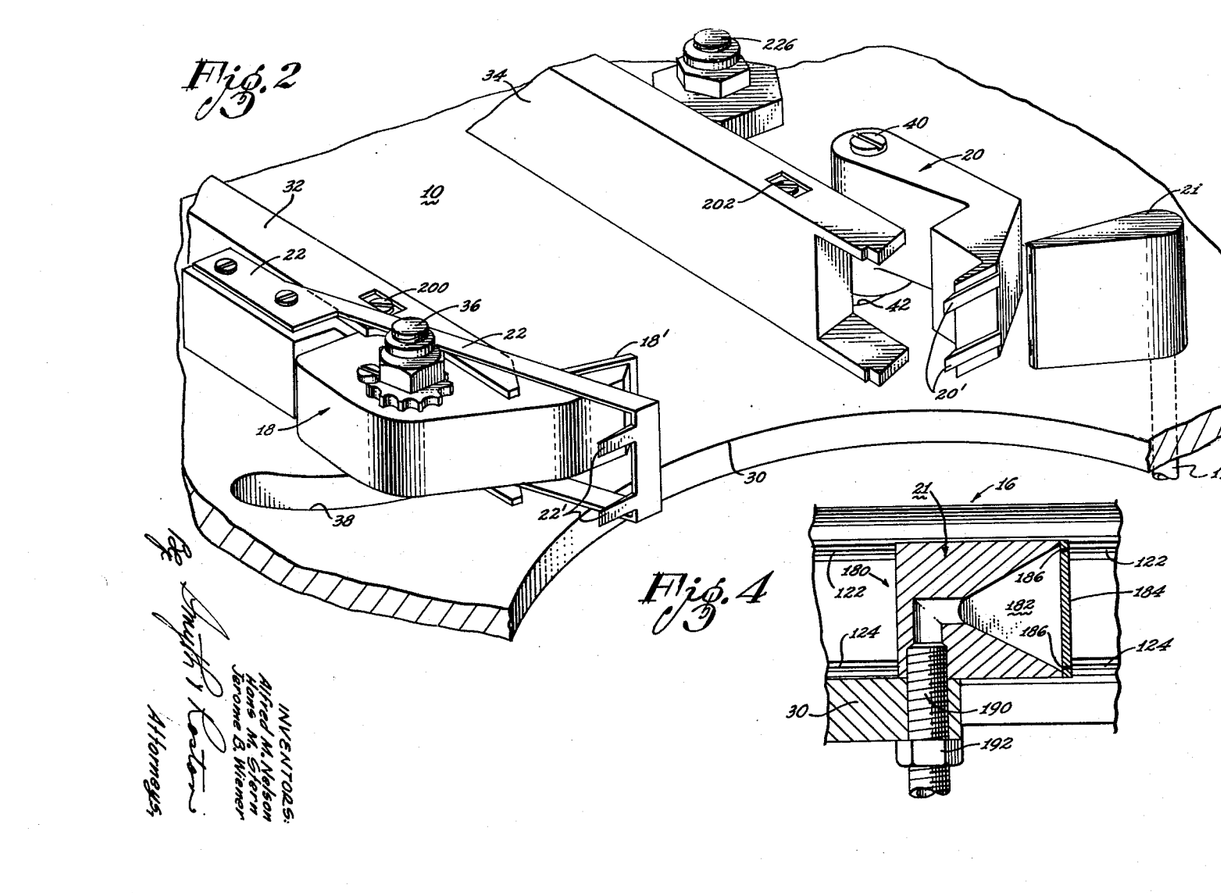
FIGURE 2 is a perspective view of a reversible feeding-stacking card holding station constructed in accordance with the invention and showing particularly a pivotally mounted feed head and a pivotally mounted stack head which are alternately brought from a stand-by position into an operating position to condition the station for one operational mode or the other, this view also showing a blower member which enables cards selectively to be deposited into the station when it is conditioned to its stacking mode.
FIGURE 4 is a sectional view substantially on the line 4—4 of FIGURE 1 to show the details of the blower member which is used in conjunction with the stack head to enable cards to be controllably deposited into the reversible card holding station of the invention when the station is in its stacking mode.

A pick-off member 22 is positioned adjacent the leading wall of the reversible station 10, and this pick-off member has a pair of fingers $22^1$ (as best shown in FIGURE 2) which extend into peripheral grooves in the drum 16. These fingers are humped radially outwardly so that the cards transported on the periphery of the drum 16 ride over the fingers and are lifted outwardly from the periphery of the drum. Any card arrested by the stack head 20 due to the activation of the blower 21 has its trailing edge projecting over the fingers $22^1$. The second card transported by the drum 16 rides up over the fingers $22^1$ and under the preceding card so as to pry the preceding card from the periphery of the drum. The second card may also be stopped by the stack head 20 when the blower 21 is activated so as to deposit the preceding card into the station. Alternately, the second card may pass up over the pick-off 22 and under the stack head 20 when the blower 21 is not activated, and the second card may then continue on the periphery of the drum 16.

The reversible feeding-stacking station 10, therefore, as described above, has two operational modes: A feeding mode, in which cards are held in stacked relationship in the station, and in which the feed head 18 is in its operative position, so that the cards may be controllably and successively fed to the peripheral surface of the drum 16 under the control of vacuum pressure exerted at the face $18^1$ of the feed head; and a stacking mode in which cards may be stripped from the peripheral surface of the drum 16 and be deposited in the station.

When the reversible station 10 is in the feeding operational mode, the stack head is in its stand-by position and any cards transported by the drum 16 are able to pass under the mouth of the station and past the cards held in the station by the feed head. In the stacking operational mode of the station, the stack head is moved to its operational position and the feed head is withdrawn to its stand-by position. Now, the cards transported on the periphery of the drum 16 may be stopped by the dual action of the stack head 20 and the blower 21, or such cards may pass under the station and continue on the periphery of the drum 16.

The stack head 20 has a lip portion which serves to support the cards in the station when the stack head is in its operative position. The leading card in the station under this latter condition, therefore, has its trailing edge supported on the pick-off fingers $22^1$, and it has its leading edge supported on the lip of the stack head 20. This leading card, in turn, serves to hold the other cards in a stacked relationship within the station.

The reversible station 12 may have a feed head 18a positioned adjacent its leading wall, and this latter station may have a stack head 20a positioned adjacent its trailing wall. The station 12 may also have a pick-off member 22a mounted adjacent the feed head 18a. The feed head 18a and the stack head 20a may be similar in their construction and operation to the corresponding heads 18 and 20 associated with the station 10. Likewise, the pick-off member 22a may be similar in its construction to the pick-off member 22. The station 12 may also include a blower member 21a which is mounted adjacent the stack head 20a and which, like the blower 21, serves to introduce controllably a stream of pressurized fluid tangential to the periphery of the drum 16 and between the stack head 20a and the periphery of the drum 16.

The reversible station 12 is illustrated as being in a stacking mode of operation. In this mode, the feed head 18a is moved to an operative position. Cards may be held in the station 12 by the fingers $22^1a$ of the pick-off 22a, and by the lip of the stack head 20a.

In the feeding mode of operation, the reversible station 10 may contain a plurality of information storage cards in stacked relationship. In that mode of operation, the station 10 is conditioned to feed cards controllably to the drum 16. The station 12 may be empty under these conditions, and it may be conditioned to its illustrated stacking mode. The cards from the station 10 may now be controllably fed to the transport drum 16 and transported by that drum past the mouth of a station 10a and past the transducer means 13 for processing. The station 10a may be similar in its construction to the station 10, and it may be conditioned to its stacking mode. However the blower associated with the station 10a is now deactivated. After the processing of the cards by the transducer means 13, the cards may be deposited in the station 12 by activating the blower member 21a. Alternately, any of the cards may pass under the station 12 by selectively de-energizing the blower 21a to enable selected ones of the cards to be stacked in other stations, such as the station 12a. These features are disclosed but not claimed in Patent No. 2,905,465 issued to the same assignee as the assignee of record in this application. The station 12a may be similar to the station 12, and it may be conditioned to its stacking mode, and the blower associated with the station 12a may now be activated.

At the completion of the processing operation, the operational modes of the reversible stations may be reversed so that cards may be returned to the station 10. The cards may be further processed by the transducer means 14 during this return. The return of the cards to the station 10 may now be effectuated by moving the stack head 20 to its operational position and by activating the blower 21. The selective deactivating of the blower 21 can cause selected ones of the cards to pass under the station 10 to be deposited in other stations, such as the station 10a whose blower may now be activated.

As noted above, this ability of the reversible stations of the present invention to enable cards selectively to be passed by certain stations by the drum 16 greatly facilitates the use of the station in systems which perform sorting and other operations and in which different cards are to be deposited in different stations.

The system of FIGURE 1 is, of course, intended merely to illustrate an operational application of the reversible station of the present invention. The invention itself, as noted above, will find wide utility in most, if not all, vacuum pressure rotatable drum data processing systems, and in other types of data processing systems for handling information storage cards.

The perspective view of FIGURE 2 illustrates in more detail the reversible station 10. The stations 10a, 12 and 12a may be similar in their construction to the station 10, as noted. The constructional details of the card holding stations may be similar in some respects to the reversible stations described in detail in the copending application Ser. No. 645,639.

The reversible station 10 of FIGURE 2 includes a base plate 30. A pair of spaced and parallel guide rails 32 and 34 are mounted on the base plate 30. These guide rails constitute respectively the leading and trailing walls of the station, and they are spaced a distance corresponding substantially to the length of the information cards. The information cards are stacked in the reversible station between the guide rails in generally vertical planes with their lower edges resting on the base plate 30. The base plate 30 is secured to the table top 11, and it may when so desired be formed as a portion of the table top. The forward end of the base plate 30 has an arcuate shape to receive the periphery of the rotatable vacuum transport drum 16. The guide rails 16 extend away from the arcuate forward end of the base plate.

The feed head 18 is pivotally mounted adjacent the end of the guide rail 32 on a pivot shaft 36, and the feed head is movable in an arcuate slot 38 in the base plate 30, as will be described in detail subsequently. The arrangement is such that when the feed head 18 is moved to a stand-by position, the feed head is retracted out of the mouth of the reversible station.

The pick-off member 22 has a supporting bracket portion which defines a rectangular area through which the feed head 18 is movable. As previously noted, the pick-off member includes a plurality of humped fingers $22^1$ which are adapted to extend into peripheral grooves in the rotatable vacuum pressure transport drum 16.

As mentioned previously, the forward end of the guide rail 34 defines a throat area with the periphery of the transport drum 16. This throat area has a width sufficient to pass only a single card at a time whenever the vacuum pressure at the surface $18^1$ of the feed head is interrupted. The stack head is pivotable about a pivot shaft 40, and this head is movable in a slot 42 in the base plate 30.

When the feed head 18 is in its operative position for the feeding mode of operation of the station, and the stack head 20 is withdrawn to its stand-by position, the cards are free to pass one at a time through the throat area described above. However, when the stack head 20 is moved to its operative position for the stacking mode of operation of the station, and the feed head 30 is retracted, the fingers $20^1$ of the stack head move between the end of the guide rail 30 and into the mouth of the station to form a supporting lip for cards in the station. The stack head blocks the throat area insofar as these cards are concerned, and causes cards that are stacked in the station to be retained in the station.

As noted above, and as more clearly shown in FIGURE 5, the face of the stack head 20 is spaced from the periphery of the drum 16 when the stack head is in its operative position to permit cards to be transported on the periphery of the drum past the station. The blower member 21 is mounted on the base plate 30 in the illustrated position in FIGURES 2 and 5. The details of this blower member will be described in detail in conjunction with FIGURE 4. As noted, this member serves controllably to introduce a stream of pressurized fluid tangentially of the peripheral surface of the drum 16 and between the drum and the stack head 20 for the reasons described above.

The rotatable drum 16 may be constructed in any suitable manner. For example, it may be similar in its construction to the transport drum disclosed and claimed in copending application Serial No. 600,975 which was filed July 30, 1956 by Loren R. Wilson, now U.S. Patent No. 2,883,189. The details of the transport drum illustrated in FIGURE 3 are similar to the embodiment of the drum disclosed and claimed in the Wilson application Serial No. 600,975.

Figures 3, 5:
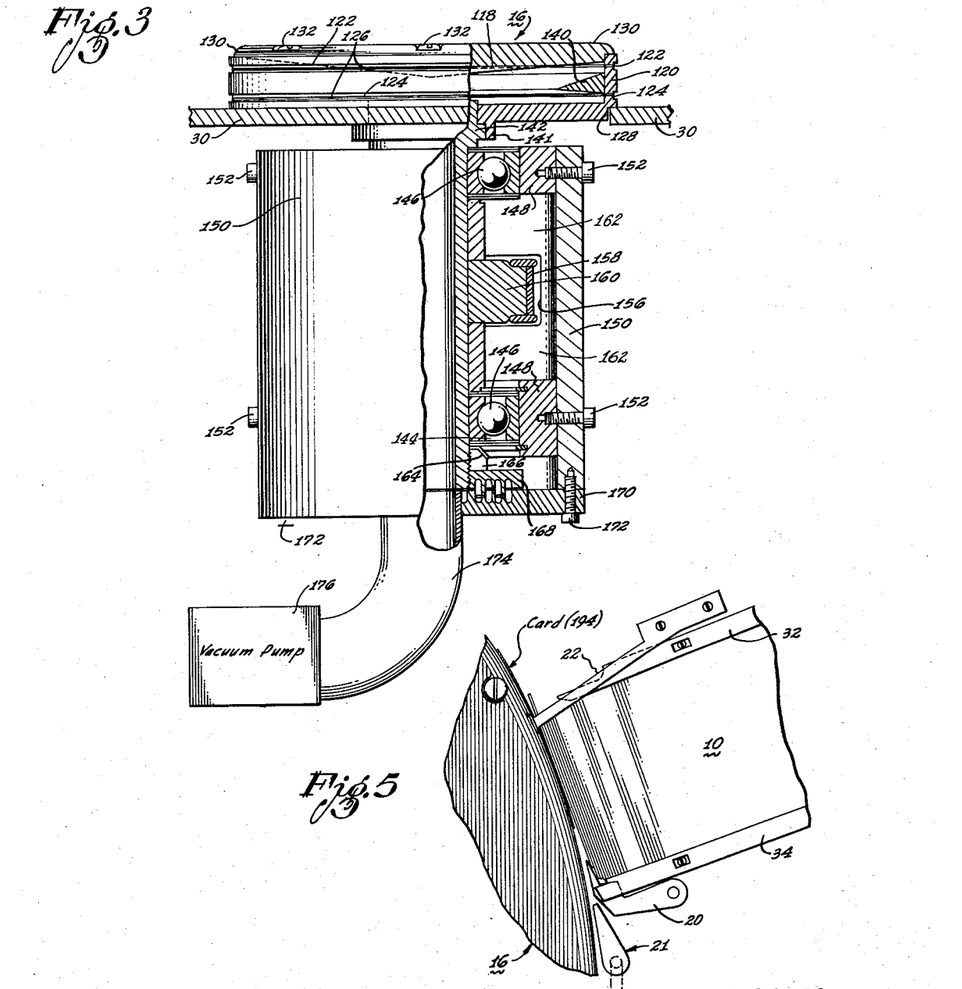
FIGURE 3 is a sectional view substantially on the line 3—3 of FIGURE 1 to illustrate the details of the rotatable drum which constitutes the transport means in the system of FIGURE 1, this view particularly illustrating the constructional details of the drum and the manner in which a vacuum pressure is provided at its peripheral surface so that cards may be securely held on that surface so as to be transported by the drum.
FIGURE 5 is a fragmentary top plan view of a portion of the reversible card holding station of the invention, this view especially illustrating the stack head in its operative position, and the blower member, these elements being spaced from the transport means so as to enable cards to be carried past the station by the transport means when such is desired, even though the station is in its stacking mode and even though cards may already be held in stacked condition in the station.
Figure 6:
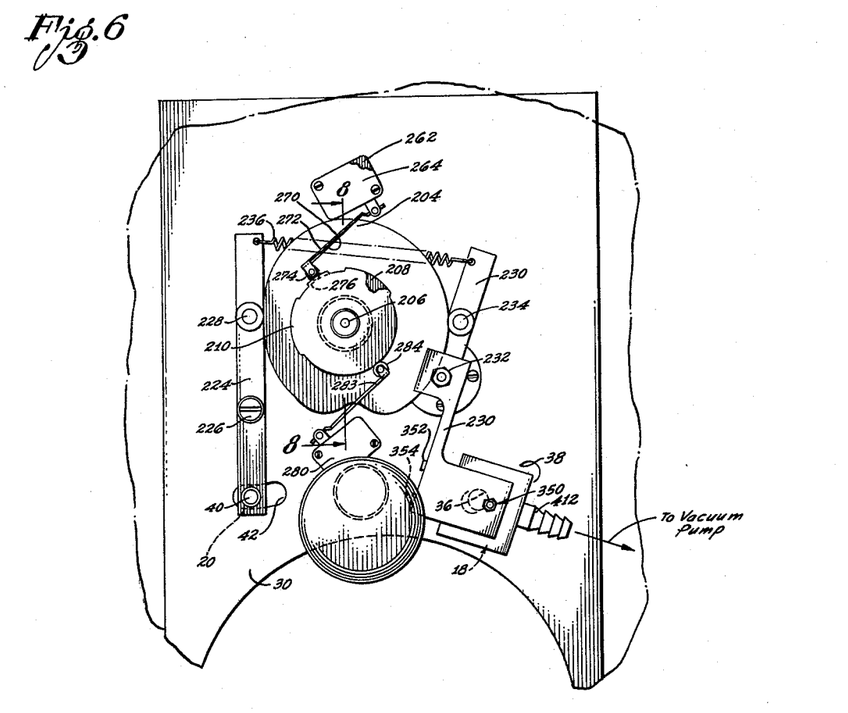
FIGURE 6 is a bottom view of the apparatus of the invention revealing a rotatable cam mechanism which is incorporated in the apparatus and which actuates the feed head and the stack head of the station, this cam mechanism functioning to bring the feed head into an operative position as the stack head is moved to a stand-by position for one operational mode of the station, and to bring the stack head into an operative position while the feed head is moved to a stand-by position for the second operational mode of the station.

As shown in FIGURE 3, the drum 16 has a lower section and an upper section. The lower section of the drum includes a disc-like bottom portion 118 and an integral annular side portion 120. A pair of axially spaced peripheral orifices 122 and 124 extend through the side portion 120. Each of these orifices has an external groove associated with it for receiving the fingers 22¹ of the pick-off member 22.

The peripheral orifices are discontinuous in that they are interrupted at selected intervals by a series of ribs 126 which are integral with the side portion 120. The integral ribs 126 interrupting the orifice 122 are staggered with respect to the ribs interrupting the orifice 124. This staggering of the ribs is such that the orifices will not weaken to any appreciable extent the integral characteristics of the side portion 120. The staggering of the ribs 126 also ensures that a vacuum pressure will be provided at every angular position around the periphery of the drum 16.

The disc-like bottom portion 118 of the lower section of the drum is undercut, as shown at 128. This enables the base plate 30 to extend beyond the outer limits of the side portion so that the portion 120 overlaps the base plate in the illustrated manner. Therefore, the cards supported end-wise on the base plate in the station 10, and in the other stations, have no tendency to slip down between the base plate and the drum as they are fed to and from the stations.

The upper section of the drum 16 is in the form of a disc-like member 130 which engages the annular side portion 120 of the lower section. The disc-like member 130 forms an enclosure with the lower section of the drum, with the upper section being parallel to the disc-shaped bottom portion 118 of the lower section. The disc-like member 130 is held in place on the side portion 120 by a series of screws 132.

When one of the information storage cards is fed from the card holder 10 to the periphery of the drum 16, it is held by vacuum pressure on the outer peripheral surface of the side portion 120, as will be described. It is essential that the cards be fed to this peripheral surface in an accurately oriented position so that they may be properly processed. The guide rails 32 and 34 of the reversible station 10 cooperate with the base plate 30 to direct the cards with a proper orientation to the peripheral surface of the side portion 120 of the lower section of the drum 16. It is usual to include a resilient pusher member (not shown) within each of the card holding stations and this member serves continually to bias the cards forward towards the mouth of the station and to hold the cards in a stacked relation in the station.

A deflector ring 140 is supported within the interior of the drum 16 in press fit with the inner surface of the annular side portion 120. This deflector ring is tapered toward the center of the drum to prevent turbulence and to provide a streamlined path for air which is drawn in through the orifices 122 and 124. The under surface of the upper section 130 is bulged toward the center of the section so as to have a convex shape. This convex shape also cooperates with the deflector ring 140 in providing a smooth path for the air drawn in through the orifices 122 and 124.

The portion 118 of the lower section of the drum 16 has an annular sleeve 141 which extends downwardly from the portion 118. The sleeve 141 fits on a collar 142 provided at one end of a hollow shaft 144 and it has a friction fit with the collar. Therefore, rotation of the hollow shaft 144 causes the drum 16 to rotate. Also, the interior of the shaft 144 communicates with the interior of the drum.

Bearings 146 are provided at opposite ends of the shaft 144. The inner races of the bearings 146 are mounted on the shaft 144, and the outer races of the bearings are disposed against bushings 148 secured to a housing 150 as by studs 152. An arcuate opening 156 is provided in the housing 150 between the bearings 146. This opening enables a drive belt 158 to extend into the housing and around a pulley 160. The pulley 160 is keyed to the shaft 144 between the bearings 146, and it is held against axial movement by sleeves 162 positioned on the shaft between the bearings and the pulley. In this way, the shaft 144 and the drum 16 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft and is maintained in fixed position on the shaft by a lock washer 164. A sealing disc 168 is also screwed on the threaded portion at the bottom of the shaft 144. The sealing disc 168 operates in conjunction with a bottom plate 170 to inhibit the movement of air between the interior of the housing 150 and the interior of the hollow shaft 144 when a difference of pressure exists between the housing and the shaft.

The bottom plate 170 is secured to the housing 150 by a series of studs 172 and is provided with a central opening. A hollow conduit 174 extends into the opening in friction fit with the plate 170. The conduit 174 is axially aligned with the hollow shaft 144 so that air may be exhausted from the hollow interiors of the shaft and of the conduit by a vacuum pump 176. The vacuum pump may be of any suitable known construction and for that reason is shown in block form in FIGURE 3.

The vacuum pump 176 draws air in through the orifices 122 and 124 and through the interior of the drum 16 down the shaft 144 and through the conduit 174. This creates a vacuum pressure at the outer peripheral surface of the annular portion 120 of the lower section of the drum. The deflector ring 140 and the convex underside of the disc-like upper section 130 assure that the air will flow smoothly and with a minimum of turbulence. This provides a high and adequate vacuum pressure around the outer peripheral surface of the annular side portion 120 to firmly retain the cards on that surface.

As noted above, the constructional details of the blower 21 are shown in FIGURE 4. This blower may include a housing 180 having a thick end and a thin end, and having a tapered configuration when viewed in plan. An interior bell shaped chamber 182 is formed in the housing 180 and this chamber flares in elevation toward the thin end of the blower. An apertured strip 184 is secured to the thin end of the blower member, and this strip has a pair of apertures 186 which communicate with the internal chamber 182 and which are respectively aligned with the peripheral orifices 122 and 124 in the drum 16. As shown in FIGURE 4, the bell-like chamber 18 is tapered in elevation so that its relatively narrow throat is disposed to the left in FIGURE 4. A conduit 188 communicates with the narrow throat of the chamber, and this conduit has a right angle bend in it which provides a downwardly extending portion.

A threaded tubular fitting 190 extends up through the base plate 30 and into the housing 180 in axial alignment with the conduit 188. The tubular fitting 190 is secured to the housing in any appropriate manner. For example, it may be threaded into the housing to constitute an airtight seal with the housing. A nut 192 is threaded to the tubular fitting 190 on the underside of the base plate 130. This fitting serves to support the blower 21 securely on the base plate 30, and it enables the position of the blower to be pivotally adjusted so that it may direct pressurized fluid in the required direction tangentially with the drum 16 and between the stack head 20 and the drum.

The tubular fitting 190 may be coupled to any appropriate line for supplying a pressurized fluid, such as air, to the blower. A solenoid valve (not shown) may be included in the line so that the flow of the pressurized fluid to the blower may be controlled. When the solenoid valve is opened, the pressurized fluid enters through the tubular fitting 190 into the conduit 188 and through the conduit to the chamber 182. A resulting pressure builds up within the chamber, and pressurized streams emerge from the apertures 186 in the strip 184. The blower 21 is adjusted, as noted above, so that these streams extend tangentially of the drum 16 to counteract the vacuum pressure exerted at the peripheral orifices 122 and 124. As noted above, the streams of pressurized fluid from the blower function to strip the leading edge of a card on the peripheral surface of the drum 16 coming under their influence, so that the card may be arrested by the stack head 20.

The fragmentary view in FIGURE 5 is intended to show in greater detail the relation between the stack head 20, the blower 21 and the periphery of the drum 16, when the stack head is in its operative position. As clearly shown in FIGURE 5, both the stack head 20 and the blower 21 are spaced from the periphery of the drum 16. This enables a card, such as the card 194, to be carried by the periphery of the drum 16 past the stack head 20 and past the blower 21 when the blower is deactivated. However, when the blower is activated to emit streams of pressurized fluid, a card carried into its influence is caused to move up over the lip formed by the fingers 20' of the stack head to be deposited in the station 10 in the described manner.

Detailed constructional features of the reversible card holding station 10 are shown in FIGURES 6–10. It should again be pointed out that these constructional features are similar to those described in copending application Ser. No. 645,639 referred to above.

Figures 7, 8:
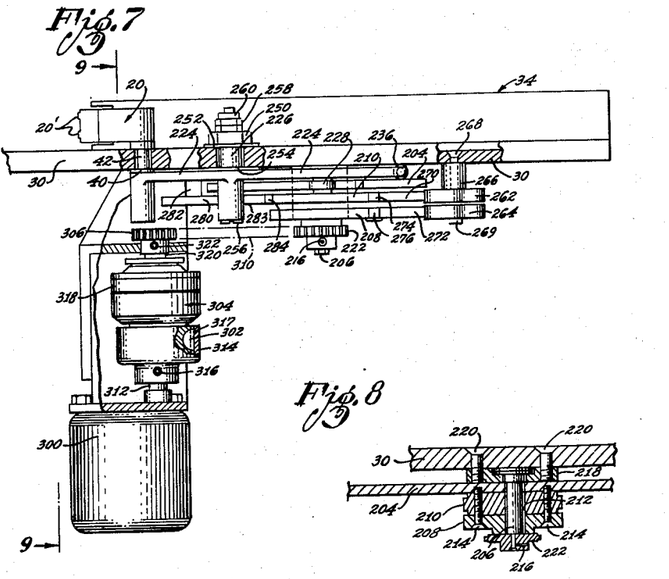
FIGURE 7 is a side view, partially in section, of the reversible card holding station of the invention to particularly illustrate the driving means for the cam mechanism of FIGURE 6.
FIGURE 8 is a fragmentary side sectional view of the reversible card holding station showing how the cam mechanism of FIGURE 6 is mounted on a rotatable cam shaft.

As shown in FIGURE 2, for example, the guide rail 32 is secured to the base plate 30 by a plurality of cap screws, such as the cap screw 200. The guide rail 34 is mounted on the base plate in spaced parallel relation to the guide rail 32 by means of a plurality of cap screws such as the cap screw 202. As more clearly shown in FIGURE 6, a cam 204 for moving the feed head 18 and the stack head 20 is keyed to a cam shaft 206 to be rotatable on the underside of the base plate 30. A pair of switch actuator cams 208 and 210 may also be mounted on the cam shaft 206 in coaxial relationship with the cam 204. As best shown in FIGURE 8, the cams 204, 208 and 210 are keyed to the cam shaft 206 by a key 212. The cams are held together by a plurality of screws such as the screws 214, and they are held on the shaft 206 by a sprocket wheel 222. As described in the copending application Ser. No. 645,639, the switch actuator cams are used to control a group of switches (to be referred to), and these switches may be used to effectuate certain electronic controls for conditioning the card holding station 10 between its feeding mode and its stacking mode.

The sprocket wheel 222 is rigidly mounted on the end of the shaft 206 by a setscrew 216 (FIGURES 7 and 8). A bearing 218 is supported on the underside of the base plate 30 by a series of screws such as the screws 220 (FIGURE 8). The bearing 218 is coaxial with the cam shaft 206, and it provides a bearing surface for the cam 204. A chain drive is coupled to the sprocket 222 in a manner to be described to produce rotation of the cams 204, 208 and 210. A lever arm 224 (FIGURES 6 and 7) is pivotally mounted on the undersisde of the base plate 30 on a pivot shaft 226. The shaft 40 which supports the stack head 20 extends upwardly from one end of the lever arm 224 through the slot 42 in the base plate 30.

A cam follower 228 is rotatably mounted on the lever arm 224 at an intermediate point on the arm between the pivot shaft 226 and the end of the arm remote from the actuating shaft 40. The cam follower 228 is adapted to ride on the peripheral edge of the cam 204. A second lever arm 230 (FIGURE 6) is pivotally mounted on a pivot shaft 232 at the other side of the cam 204. The lever arm 230 has a cam follower 234 rotatably mounted at an intermediate point on the arm between the pivot shaft 232 and the upper end of the arm in FIGURE 6. A coil spring 236 is connected between the ends of the lever arms 224 and 230 in FIGURE 6, and this spring biases the cam followers 228 and 234 against the peripheral edge of the cam 204. The cam 204 is shaped so that in one angular position it moves the lower end of the lever arm 224 in FIGURE 6 to the left end of the slot 42 and the lower end of the lever 230 to the left end of the slot 38 in that figure. In a second angular position of the cam 204, the cam 204 moves the lower end of the lever arm 228 in FIGURE 6 to the right end of the slot 42, and it moves the lower end of the arm 230 in FIGURE 6 to the right end of the slot 38 in that figure.

The view of FIGURE 7 clearly shows the lever arm 224, and the pivot shaft 226 for this arm. As shown in this latter figure, the pivot shaft 226 extends through the base plate 30, and this shaft is held in place by a nut 250 which is threaded to the end portion of the shaft 226 projecting above the base plate 30. A pair of washers 252 and 254 are respectively interposed between the nut 250 and the base plate, and between the lever arm 224 and the base plate. The lever arm 224 is secured to the shaft 226 by a screw 256 which extends through the shaft. The head of this screw engages a tubular central portion of the lever arm, and the screw is held in place by a nut 258 and an associated elastic stop nut 260.

A pair of switches 262 and 264 may be mounted on the underside of the base plate 30 by means of a mounting bracket 266 (FIGURE 7). The mounting bracket is secured to the base plate by a cap screw 268, and the switches are secured to the mounting bracket by a fillister screw 269.

The switches 262 and 264 have respective actuating arms 270 and 272. A pair of cam followers 274 and 276 are respectively rotatably mounted at the respective ends of the arms 270 and 272. The cam followers 274 and 276 are adapted respectively to engage the cams 210 and 208. The arms 270 and 272 are spring-biased in a counterclockwise direction to bias the cam followers 274 and 276 against the peripheral edges of the cams 208 and 210. Detents are disposed around the cams 208 and 210 so that the switches 262 and 264 may be actuated in correspondence with selected angular positions of the cam 204.

A third switch 280 (FIGURES 6 and 7) may be mounted on the underside of the base plate 30 by a mounting bracket 282. This latter switch is positioned on the opposite side of the cam 210 from the switch 262. The switch 280 has an actuating arm 283 which is spring-biased to urge a cam follower 284 against the periphery of the cam 210, the cam follower 284 being rotatably mounted at the end of the switch actuator 282.

As noted above, the switches 262, 264 and 280 may conveniently be connected into a control system for actuating the reversible card holding station 10. Such a control system is particularly described in the copending application Ser. No. 645,639 referred to above.

The sprocket 222 which drives the cam mechanism is coupled to a drive motor 300 in the following manner. The drive motor may be a 23 r.p.m., 1/1000 horsepower model, and it is keyed through a coupler 302 (FIGURE 7) to an overriding clutch 304. The clutch 304, in turn, is coupled to a sprocket 306. The drive chain 310 couples the sprocket 306 to the sprocket 222. When the clutch 304 is engaged, the motor 300 drives the sprocket 306 which, in turn, drives the sprocket 222 to rotate the cams 204, 208 and 210.

Figure 9:
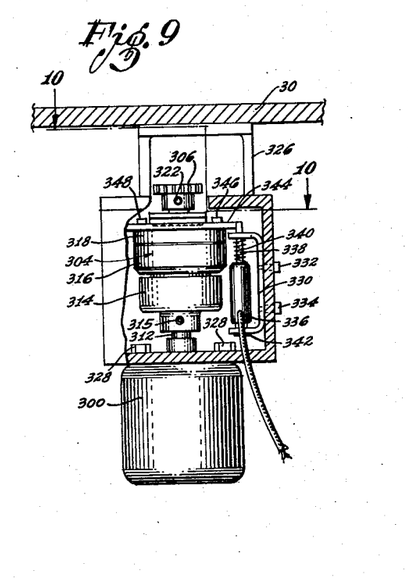
FIGURE 9 is another view, partially in section, of the driving means for the cam mechanism and is taken substantially on the line 9—9 of FIGURE 7, the latter view particularly showing a clutch for coupling a drive motor to the cam shaft referred to above for operating the cam mechanism, and this view also showing a solenoid means for actuating the clutch.
Figure 10:
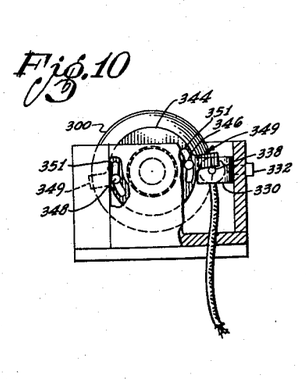
FIGURE 10 is a view, partially in section, and this view is taken substantially on the line 10—10 of FIGURE 9 to show further details of the clutch mechanism referred to above.

Details of the clutch mechanism are shown in FIG-

URES 9 and 10. As more clearly shown in these latter figures, the motor 300 has a drive shaft 312 to which a cylindrical collar 314 is affixed by means, for example, of a stud 315. The collar 314 forms a portion of the coupler 302, and the collar is keyed to a first portion 316 of the clutch 304 by means, for example, of a key 317 (FIGURE 7).

When the clutch is disengaged, the portion 316 of the clutch 304 is freely rotated by the motor 300, and this portion rotates with respect to a second portion 318 of the clutch, the second portion being keyed to a drive shaft 320 on which the sprocket 306 is mounted as by a setscrew 322. Rotation of the section 318 of the clutch 314 produces a rotation of the sprocket 306 which, in turn, causes the chain 310 to drive the sprocket 222 of the cam mechanism. Such rotation is realized when the clutch is engaged.

The clutch mechanism is enclosed in a housing 324 (FIGURE 9), and this housing is mounted on the underside of the base plate 30 by means of a suitable bracket 326. This bracket is appropriately welded to the underside of the base plate and to the housing 324. The housing also serves as a support for the motor 300, the motor being mounted to the end of the housing as by nuts 328 which are threaded to the studs from the motor protruding through the end of the housing. A U-shaped bracket 330 (FIGURE 9) is mounted on the inside of the housing 324 by means of a pair of cap screws 332 and 334. The bracket 330 is disposed to one side of the clutch 304, and it serves to support a solenoid 336. The solenoid 336 is positioned so that its longitudinal axis extends substantially parallel to the rotational axis of the motor 300 and of the clutch 304.

The solenoid 336 has an armature 338 which extends through one end of the U-shaped bracket 330 when the solenoid is not energized. When the solenoid is energized, the armature 338 is retracted against the compression of a spring 340. The solenoid is held in the U-shaped bracket by a screw 342 extending through the other end of the bracket and into the other end of the solenoid.

The clutch 314 is of the overriding type, and it may be of the type commonly referred to as a "Hilliard" clutch. The clutch includes a release bracket 344 which is mounted adjacent the section 318 in coaxial relation with the axis of rotation of the clutch. The bracket 344 has a pair of radial ears 349 (FIGURE 10) positioned diametrically opposite each other. A pair of cap screws 346 and 348 extend from the section 318 of the clutch through slots 350 and 351 formed in the release bracket 344.

One ear of the bracket 344 normally engages the end of the solenoid armature 338 protruding through the bracket 330 to hold the clutch 304 in a released condition. This may best be seen in FIGURE 10. However, when the solenoid is energized to retract the armature 338, the armature releases the bracket 344 so that the section 318 of the clutch is free to be rotated by the section 316. If the solenoid is energized only for an extremely short interval, the diametrically opposite ear of the bracket 344 engages the armature 338 so that the bracket makes only one-half revolution. This means that the solenoid 336 can be pulsed, and each time it is so pulsed, the cam mechanism is driven to one-half a complete revolution. The cam can be so shaped that in a first one-half revolution the lever 224 (FIGURE 6) is rotated to bring the stack head 20 to the operative position and the lever 230 is rotated to bring the feed head 18 to the standby position. The next half revolution of the cam can be such as to return the stack head 20 to the standby position and to bring the feed head 18 to the operative position.

In the previous discussion, the cards have been lifted from the drum 16 to the fingers 20' of the stack head 20 in FIGURE 1 by directing a stream of air under pressure through a blower 21 in a direction tangential to the cards. This stream of air acts to shear the cards from the peripheral surface of the drum and lift the leading ends of the cards to the fingers 20' for movement along the fingers into the station 10. The pneumatic force exerted on the leading ends of the cards to obtain a stacking operation may be exerted in a radial direction as well as a tangential direction. This may be seen from FIGURE 11 which shows a blower 500 directed in a radial direction through the drum 16.

Figure 11:
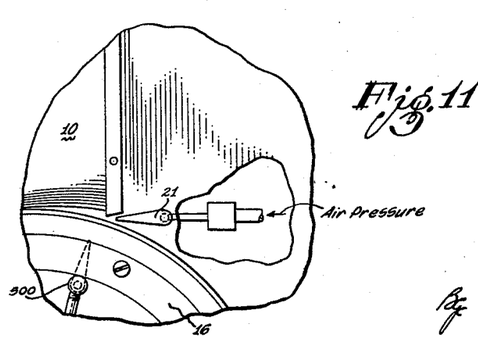
FIGURE 11 is a fragmentary top plan view, similar to the view of FIGURE 5, showing a modified form of the invention.

The blower 500 may be constructed in a manner similar to that of the blower 21 and is disposed to direct streams of air under pressure in a direction radially outwardly relative to the movement of the drum 16. This causes the blower 500 to exert a pneumatic force in a direction substantially perpendicular to the card surfaces facing the periphery of the drum 16. The force is instrumental in lifting the card from the peripheral surface of the drum 16 into the station 10.

It should be appreciated that the blowers 21 and 500 may be used simultaneously, or as an alternative, each of the blowers may be used at the time that the other blower is not used. When the blowers are used simultaneously, either of the blowers may provide the main force for transferring the cards to the card holder station 10 and the other blower may provide an auxiliary force for facilitating the transfer. As an alternative, both of the blowers may act with equal effect in obtaining a transfer of the cards to the card holder station.

The invention provides, therefore, an improved reversible station for holding information storage cards in a stacked relation. The station may be controlled to a feeding mode in which the cards may be selectively and controllably fed to a transport medium. Alternately, the station can be controlled to a stacking mode in which the cards from the transport medium may be selectively and controllably stacked into the station. In either mode, and in the described manner, cards may be transported by the transport means past the station to be deposited, for example, in other stations or to be transferred to other drums for further processing.

This "pass-under" feature of the invention is accomplished in the illustrated embodiment by means of a blower which is mounted adjacent the stack head. This blower, as described may be controlled to direct a stream of pressurized fluid between the stack head and the peripheral surface of the drum. It should be apparent that the blower member may have other locations. For example, it may be mounted within the drum 16 to direct the pressurized fluid radially outwardly from the drum. Also the blower may be mounted in the stack head itself to form a component part of the stack head.

It should be appreciated that the blowers 21 and 500 do not necessarily have to be used with a reversible station. For example, the blowers can be used with a station which serves only to stack cards. Furthermore, the fingers 20' of the stack head 20 do not necessarily have to be included as part of the station. For example, the blower 500 would be instrumental in maintaining the cards in position within the station. The blower 500 would replace the fingers 20' since it exerts a force in perpendicular direction against the leading end of the cards to remove the leading end from the periphery of the drum 16.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In apparatus for processing data on a plurality of information storage cards as represented by signal indications on the cards, the combination of, a card holder for maintaining the cards in a stacked relationship, a stack head positioned adjacent the card holder for retaining information storage cards in the card holder when in an operative position, means for shifting the stack head between the operative position thereof and a stand-by position to enable cards to be fed from the card holder, transport means disposed in contiguous relationship to the stack head for providing a movement of cards toward the stack head for transfer by the stack head into the card holder when the stack head is in the operative position, and means including a blower member for controllably introducing air under pressure in the vicinity of the stack head to selectively transfer cards from the transport means into the card holder in the operative position of the stack head.

2. In apparatus for processing data on a plurality of information storage cards as represented by signal indications on the cards, a combination of, transporting means movable to provide a movement of cards with the transport means, a card holder positioned adjacent the transporting means for maintaining the cards in a stacked relationship, stacking means for retaining the cards in the card holder, means for moving the stacking means to an operative position spaced from the transporting means to retain cards in the card holder and for moving the stacking means to a stand-by position to enable cards to be fed from the card holder to the transporting means, and means for controllably introducing a pneumatic force between the movable means and the transporting means and in a tangential direction relative to the movement of the cards with the transport means to selectively transfer cards from the transporting means into the card holder in the operative position of the stacking means.

3. In apparatus for processing data on a plurality of information storage cards as represented by signal indications on the cards, the combination of, a rotatable vacuum pressure transporting drum for transporting cards on the periphery thereof, a stationary card holder positioned adjacent the drum for maintaining cards in a stacked relationship, a feed head for controlling the transfer of cards from the card holder to the periphery of the drum when in an operative position and movable between the operative position and a stand-by position, a stack head for retaining cards in the card holder, means for supporting the stack head for movement between an operative position spaced from the periphery of the transporting drum and a stand-by position, means for controllably introducing a fluid under pressure between the stack head and the periphery of the transporting drum in tangential relation with such periphery to selectively transfer cards into the card holder, and control means for moving the feed head to the operative position and the stack head to the stand-by position at particular times and for moving the feed head to the stand-by position and the stack head to the operative position at other times.

4. In apparatus for processing data on a plurality of discrete information storage elements as represented by signal indications on the storage elements, the combination of, a holder for the storage elements, movable means positioned adjacent the holder for retaining the storage elements in the holder when the movable means is in an operative position, means for shifting the movable means between the operative position thereof and a stand-by position to enable storage elements to be fed from the holder when the movable means is in the stand-by position, transport means disposed adjacent the holder for providing a movement of storage elements towards the movable means for transfer by the movable means into the holder when the movable means is in the operative position, and means for controllably directing fluid under pressure at storage elements moved by the transport means to the movable means to selectively transfer storage elements from the transport means into the holder in the operative position of the movable means.

References Cited in the file of this patent

UNITED STATES PATENTS

| | | |
|---|---|---|
| 1,945,248 | Winkler et al. | Jan. 30, 1934 |
| 2,764,408 | Weiler | Sept. 25, 1956 |
| 2,812,178 | Hagren | Nov. 5, 1957 |
| 2,842,362 | Hayes et al. | July 8, 1958 |
| 2,905,465 | Armstrong et al. | Sept. 22, 1959 |